US010727678B2

(12) United States Patent
Zou et al.

(10) Patent No.: US 10,727,678 B2
(45) Date of Patent: Jul. 28, 2020

(54) METHOD FOR DETERMINING A COMBINATION OF ENERGY STORAGE UNITS THAT OUTPUT ELECTRIC ENERGY DURING CHARGING BY COMPARING AN ELECTRIC QUANTITY LEVEL OF EACH ENERGY STORAGE UNIT TO AN AVERAGE ELECTRIC QUANTITY AFTER PERFORMING THE CHARGING

(71) Applicant: NIO CO., LTD., Shanghai (CN)

(72) Inventors: Jiyong Zou, Shanghai (CN); Yujun Gu, Shanghai (CN)

(73) Assignee: NIO CO., LTD., Shanghai (CN)

( * ) Notice: Subject to any disclaimer, the term of this patent is extended or adjusted under 35 U.S.C. 154(b) by 75 days.

(21) Appl. No.: 15/752,525

(22) PCT Filed: Aug. 10, 2017

(86) PCT No.: PCT/CN2017/096708
§ 371 (c)(1),
(2) Date: Feb. 13, 2018

(87) PCT Pub. No.: WO2018/184329
PCT Pub. Date: Oct. 11, 2018

(65) Prior Publication Data
US 2019/0009682 A1 Jan. 10, 2019

(30) Foreign Application Priority Data
Apr. 7, 2017 (CN) .......................... 2017 1 0224000

(51) Int. Cl.
*H02J 7/00* (2006.01)
*B60L 11/18* (2006.01)
(Continued)

(52) U.S. Cl.
CPC ......... *H02J 7/0014* (2013.01); *B60L 11/1848* (2013.01); *B60L 53/31* (2019.02);
(Continued)

(58) Field of Classification Search
CPC .... B60L 11/1848; B60L 53/31; B60L 53/665; H01M 10/44; H01M 10/441;
(Continued)

(56) References Cited

U.S. PATENT DOCUMENTS 9,800,064 B2 * 10/2017 Hwang .................... B60L 58/14
2002/0011820 A1 * 1/2002 Suzuki .................. H02J 7/0014
320/132
(Continued)

FOREIGN PATENT DOCUMENTS

EP 3051657 A1 * 8/2016 .............. B60L 58/14

OTHER PUBLICATIONS

International Search Report and Written Opinion prepared by the State Intellectual Property Office of the P.R.C. dated Dec. 14, 2017 for International Application No. PCT/CN2017/096708.

*Primary Examiner* — Richard Isla
*Assistant Examiner* — Manuel Hernandez
(74) *Attorney, Agent, or Firm* — Sheridan Ross P.C.

(57) ABSTRACT

The present invention relates to a mobile charging device, a mobile charging system and a mobile charging method. Said mobile charging system (1000) comprises an order system (100), a mobile charging device (200) and a charged object (300). Said mobile charging device (200) comprises a plurality of energy storage units ($202_1$~$202_n$) and a power controller (201) connected to said plurality of energy storage units ($202_1$~$202_n$) via an internal communication bus. In addition, said mobile charging device (200) further comprises a voltage transformer ($203_1$~$203_n$) and/or a switch array (204).

4 Claims, 5 Drawing Sheets

(51) Int. Cl.
*H01M 10/44* (2006.01)
*B60L 53/66* (2019.01)
*B60L 53/31* (2019.01)
*H02J 7/34* (2006.01)
*H01M 10/46* (2006.01)

(52) U.S. Cl.
CPC ........... *B60L 53/665* (2019.02); *H01M 10/44* (2013.01); *H01M 10/441* (2013.01); *H02J 7/0027* (2013.01); *H02J 7/0063* (2013.01); *H02J 7/342* (2020.01); *H01M 10/46* (2013.01); *H02J 7/0016* (2013.01); *H02J 7/00034* (2020.01); *H02J 2007/0067* (2013.01); *H02J 2207/20* (2020.01); *Y02T 10/7005* (2013.01); *Y02T 90/12* (2013.01); *Y02T 90/128* (2013.01)

(58) Field of Classification Search
CPC ...... H01M 10/46; H02J 7/0027; H02J 7/0063; H02J 7/0054; H02J 7/0016; H02J 7/0014; H02J 7/0065; H02J 2007/0067; H02J 2007/0096; H02J 7/342; H02J 7/00034; Y02T 90/128; Y02T 90/12; Y02T 10/7005
USPC ................................ 320/103, 107, 135, 136
See application file for complete search history.

(56) References Cited

U.S. PATENT DOCUMENTS

| | | | |
|---|---|---|---|
| 2012/0274283 A1* | 11/2012 | van Lammeren | H01M 10/4207 320/118 |
| 2013/0187466 A1* | 7/2013 | Sakai | G01R 19/16542 307/52 |
| 2016/0043578 A1* | 2/2016 | Miyamoto | H02J 7/0016 320/118 |
| 2016/0226269 A1* | 8/2016 | Hwang | H02J 7/0021 |
| 2017/0338665 A1* | 11/2017 | Long | H02J 7/0027 |

* cited by examiner

METHOD FOR DETERMINING A COMBINATION OF ENERGY STORAGE UNITS THAT OUTPUT ELECTRIC ENERGY DURING CHARGING BY COMPARING AN ELECTRIC QUANTITY LEVEL OF EACH ENERGY STORAGE UNIT TO AN AVERAGE ELECTRIC QUANTITY AFTER PERFORMING THE CHARGING

CROSS REFERENCE TO RELATED APPLICATIONS

This application is a national stage application under 35 U.S.C. 371 and claims the benefit of PCT Application No. PCT/CN2017/096708 having an international filing date of 10 Aug. 2017, which designated the United States, which PCT application claimed the benefit of China Patent Application No. 201710224000.3 filed 7 Apr. 2017, the disclosures of each of which are incorporated herein by reference.

TECHNICAL FIELD

The present invention relates to the field of charging, more particularly to a mobile charging device, a mobile charging system and a mobile charging method.

BACKGROUND OF THE INVENTION

Presently, researches on technologies about electric vehicle charging facilities and industries of electric vehicle charging facilities have rapidly developed, and constructions of mobile charging projects have accelerated. The mobile charging devices nowadays mostly use new energy batteries, which act as key intermediate energy storage between energy supplementing and charging. The main technical problems encountered in research and development of the mobile charging device are variability of quantities of electricity needed by served objects, requirement of electric quantity balance of the intermediate energy storage and requirement of maximizing the output power of the intermediate energy storage device.

In a conventional mobile charging device product, certain energy storage battery pack is often used out earlies than other energy storage battery packs. In the mobile charging device product, all energy storage battery packs operate in parallel to one another, so the output power will become lower and the service time will become longer correspondingly, as a result, the service efficiency will become lower and demands of the charging orders distributed by an order system cannot be met.

In addition, in the conventional mobile charging device product, a fixed power charging mode is adopted, i.e. shares of the charging output power taken by each energy storage battery pack are specified in advance, and in all subsequent charging processes, all energy storage battery packs will output charging power according to the specified shares, so when a certain energy storage battery pack is used out earlier than other energy storage battery packs, said energy storage battery pack needs to be replaced, thus increasing the cost.

SUMMARY OF THE INVENTION

The present invention is proposed for overcoming the above-mentioned and other shortcomings, and the technical solutions employed will be described below.

The present invention provides a mobile charging device, which comprises: a plurality of energy storage units configured to at least partially output electric energy during charging; and a power controller configured to determine a combination of energy storage units that should output electric energy during charging according to obtained electric quantity levels of each of the plurality of energy storage units as well as a quantity of electricity needed during charging, and to calculate a charging output power of each energy storage unit included in said combination of energy storage units.

Further, the mobile charging device according to the present invention further comprises a switch array arranged corresponding to the plurality of energy storage units and configured to be controlled by instructions related to the combination of the energy storage units from the power controller, so that respective switch units included therein change into an ON state.

Further, the mobile charging device according to the present invention further comprises a plurality of voltage transformers arranged corresponding to the plurality of energy storage units and configured to transform voltages output by each energy storage unit included in the combination of energy storage units according to instructions related to the charging output power from the power controller, so that said energy storage units can output electric energies during charging according to the calculated corresponding charging output power.

Further, in the mobile charging device according to the present invention, the power controller comprises: a charging task information obtaining unit configured to obtain a quantity of electricity needed for charging and a required time length for the charging service; an energy storage unit electric quantity obtaining unit configured to obtain an electric quantity level of each of the plurality of energy storage units; an average electric quantity calculating unit configured to calculate an average electric quantity before performing the charging for the plurality of energy storage units based on the electric quantity level of each energy storage unit, and to estimate an average electric quantity after performing the charging based on the needed quantity of electricity and the average electric quantity before performing the charging; and a unit for determining a combination of energy storage units configured to determine a combination of energy storage units that output electric energy during charging by means of comparing the electric quantity level of each energy storage unit to the average electric quantity after performing the charging.

Further, in the mobile charging device according to the present invention, the power controller further comprises: a unit for determining a maximum output power of the energy storage unit, which is configured to determine a maximum output power of each of the plurality of energy storage battery packs based on the electric quantity level of each energy storage unit; a unit for obtaining electric quantity of a charged object, which is configured to obtain an electric quantity level of a charged object; a unit for determining a maximum receiving power of a charged object, which is configured to determine a maximum receiving power of the charged objected based on the electric quantity level thereof; and a charging output power calculating unit, which is configured to calculate a charging output power of each energy storage unit included in the combination of energy storage units based on the electric quantity level of each energy storage unit included in the combination of energy storage units and the corresponding maximum output power, the maximum receiving power of the charged object, the average electric quantity after performing the charging, and the required time for charging service.

The present invention provides a mobile charging system, which comprises: a mobile charging device according to the present invention; a charged object configured to provide its electric quantity level to the mobile charging device and receive electric energy supply form the mobile charging device; and an order system configured to provide the mobile charging device with the quantity of electricity needed for the charging and the required time length for the charging service.

The present invention provides a mobile charging method, which comprises: step a: determining a combination of energy storage units that output electric energy during charging according to the electric quantity level of each of the plurality of energy storage units used for mobile charging and the quantity of electricity needed for the charging; and step b: calculating a charging output power of each energy storage unit included in the combination of energy storage units.

Further, the mobile charging method according to the present invention further comprises: step c: controlling a switch array arranged corresponding to the plurality of energy storage units through instructions related to the combination of energy storage units, so that the respective switch units included therein change into an ON state.

Further, the mobile charging method according to the present invention further comprises: step d: transforming voltages output by each energy storage unit included in the combination of energy storage units according to instructions related to the charging output power, so that said energy storage units can output electric energies during charging according to the calculated corresponding charging output power.

Further, in the mobile charging method according to the present invention, said step a includes: a charging task information obtaining step for obtaining a quantity of electricity needed for charging and a required time length for the charging service; an energy storage unit electric quantity obtaining step for obtaining an electric quantity level of each of the plurality of energy storage units; an average electric quantity calculating step for calculating an average electric quantity before performing the charging for the plurality of energy storage units based on the electric quantity level of each energy storage unit, and estimating an average electric quantity after performing the charging based on the needed quantity of electricity and the average electric quantity before performing the charging; and a step for determining a combination of energy storage units, which determines a combination of energy storage units that output electric energy during charging by means of comparing the electric quantity level of each energy storage unit to the average electric quantity after performing the charging.

Further, in the mobile charging method according to the present invention, said step b includes: a step for determining a maximum output power of the energy storage unit, which determines an maximum output power of each of the plurality of energy storage battery packs based on the electric quantity level of each energy storage unit; a step for obtaining electric quantity of a charged object, which obtains an electric quantity level of a charged object; a step for determining a maximum receiving power of a charged object, which is configured to determine a maximum receiving power of the charged objected based on the electric quantity level thereof; and a charging output power calculating step, which calculates a charging output power of each energy storage unit included in the combination of energy storage units based on the electric quantity level of each energy storage unit included in the combination of energy storage units and the corresponding maximum output power, the maximum receiving power of the charged object, the average electric quantity after performing the charging, and the required time for the charging service.

Compared to the prior art, the present invention has the following advantageous effects:
1) targeted at the variable quantities of electricity needed, balance among final remaining electric quantity of all energy storage units in the mobile charging device is realized;
2) targeted at the variable quantities of electricity needed, nearly full power output under any circumstance is realized, thus solving the problem that the output power of the conventional fixed power charging cannot meet the requirements when the total electric quantity is low;
3) the method of sharing the output power of the energy storage units is employed, so the number energy storage units that need to be replaced in the mobile charging device is reduced, and the cost is saved.

DETAILED DESCRIPTION OF THE INVENTION

Figure 1:
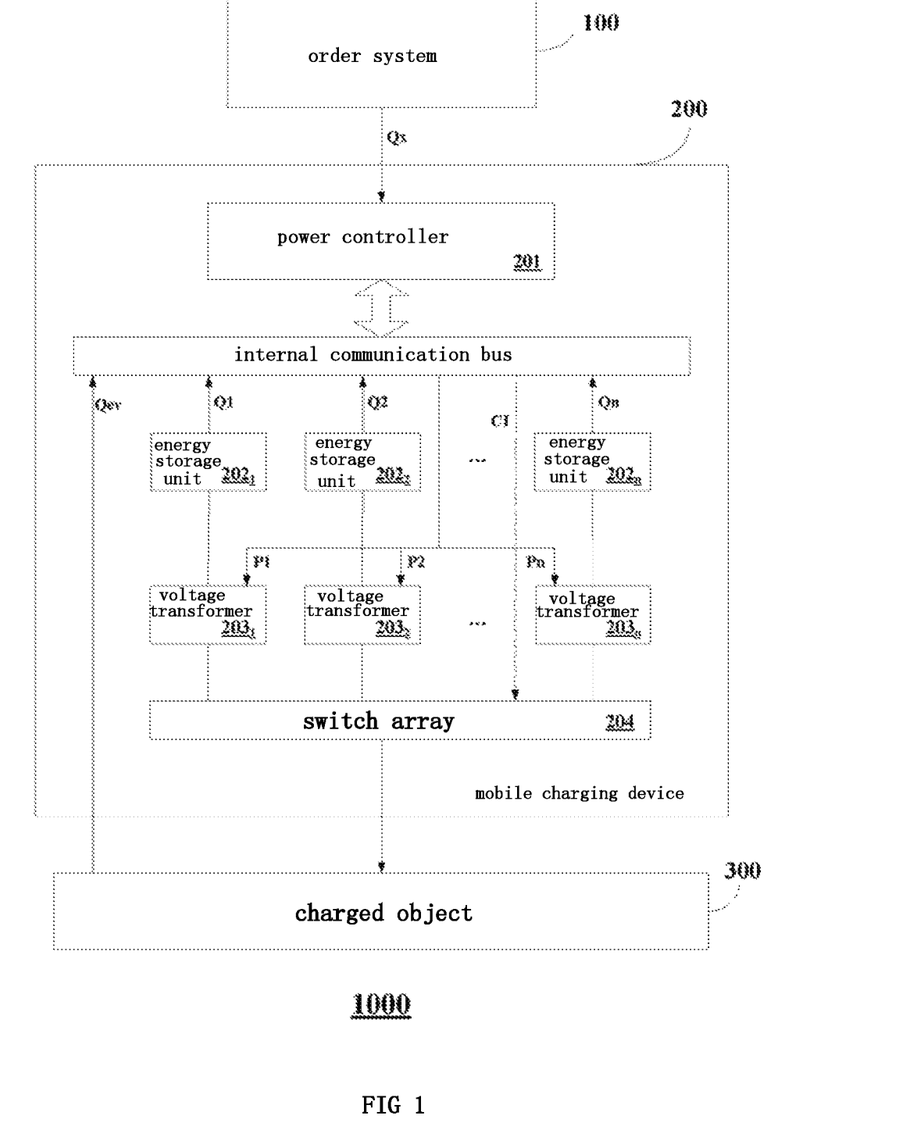
FIG. 1 is a schematic drawing of a mobile charging system 1000 according to the present invention.

The mobile charging device, mobile charging system and mobile charging method of the present invention will be described in further detail below with reference to the drawings. It shall be noted that the following specific embodiments are exemplary but not restrictive, and they are provided for facilitating basic understanding of the present invention, but they do not intend to determine the key or decisive factors or define the claimed protection scope of the present invention FIG. 1 is a schematic drawing of a mobile charging system 1000 according to the present invention. As shown in FIG. 1, said mobile charging system 1000 comprises an order system 100, a mobile charging device 200 and a charged object 300.

The order system 100 is communicatively connected to the mobile charging device 200 for distributing charging tasks to the mobile charging device 200. For example, in some embodiments, the order system 100 can be a cloud service platform, which sends charging task related information to the mobile charging device 200 by means of wireless communication. In some embodiments, the charging task may include information like the quantity of electricity needed and the required time for charging service in the charging to be performed.

The mobile charging device 200 comprises n (n being a positive integer greater than 1) energy storage units $202_1$~$202_n$ and a power controller 201.

In some embodiments, the mobile charging device 200 can be a mobile charging vehicle. Of course, application of the mobile charging device 200 is not limited to this. Any device that has the structure of the mobile charging device according to the present invention and that supplies electric energy to other devices in a mobile manner shall fall into the scope of the present invention.

The n energy storage units $202_1$~$202_n$ are connected in parallel to each other and are configured to at least partially output electric energy during charging. In some embodiments, each of said n energy storage units $202_1$~$202_n$ may either comprise only one energy storage battery or comprise a plurality of energy storage batteries. According to the present invention, in order to maintain balance among the remaining electric quantity of the energy storage units $202_1$~$202_n$ after performing each charging task, each time before the mobile charging device 200 is to start performing a new charging task, it is necessary to determine which ones of the n energy storage units $202_1$~$202_n$ will be used for performing the charging.

The power controller 201 and the n energy storage units $202_1$~$202_n$ are connected in a manner to enable data communication therebetween. In the example shown in FIG. 1, the power controller 201 is connected to the n energy storage units $202_1$~$202_n$ via an internal communication bus so as to read the electric quantity levels from the n energy storage units $2021$~$202n$. It shall be noted that said internal communication bus includes but is not limited to CAN bus.

As shown in FIG. 1, the power controller 201 determines a combination of energy storage units that output electric energy during charging according to an obtained electric quantity level Qi (i being a positive integer and 1≤i≤n) of each of the n energy storage units $202_1$~$202_n$ and a quantity of electricity Qx needed for the charging, and calculates a charging output power Pi (i being a positive integer and 1≤i≤n) of each energy storage unit included in the combination of energy storage units. In addition, as shown in FIG. 1, for each new charging task, the power controller 201 obtains charging task related information from the order system 100, such as a quantity of electricity Qx needed in the charging task to be performed. Moreover, as shown in FIG. 1, each time the mobile charging device 200 supplies electric energy to the charged object 300, it will obtains the electric quantity level Qev of the charged object 300. As for the specific structure and working details of the power controller 201, they will be described specifically after.

Preferably, in some embodiments, the mobile charging device 200 may further comprise a switch array 204. As shown in FIG. 1, the switch array 204 is arranged corresponding to the n energy storage units $202_1$~$202_n$ and is connected to the n energy storage units $202_1$~$202_n$. It shall be noted that in the switch array 204, the number of switch units connected to each energy storage unit can be one or several. In addition, as shown in FIG. 1, said switch array 204 is also connected to the power controller 201 to receive therefrom instructions CI related to the determined combination of energy storage units that output electric energy during charging. Said switch array 204 is controlled by said instructions CI, so that the switch units included therein and corresponding to the combination of energy storage units are all changed to an ON state, while the rest switch units are changed to an OFF state.

Preferably, in some embodiments, the mobile charging device 200 may further comprise n voltage transformers $203_1$~$203_n$. As shown in FIG. 1, said n voltage transformers $203_1$~$203_n$ are arranged corresponding to the n energy storage units $202_1$~$202_n$ and are respectively connected to the n energy storage units $202_1$~$202_n$. In addition, as shown in FIG. 1, said voltage transformers $203_1$~$203_n$ are also connected to the power controller 201 to receive therefrom instructions related to the charging output power Pi. Said voltage transformers $203_1$~$203_n$ transform the voltage output from each energy storage unit included in the combination of energy storage units according to said instructions, so that said energy storage units can output electric energies during charging according to the calculated corresponding charging output power. It shall be noted that the voltage transformers $203_1$, $203_2$, . . . $203_n$ can be but are not limited to DC-DC transformers.

Further, it shall be noted that although FIG. 1 shows that the voltage transformers $203_1$~$203_n$ are connected between corresponding energy storage units $202_1$~$202_n$ and the switch array 204, the structure of the mobile charging device 200 is not limited to this, and the switch array 204 can also be arranged between the respective energy storage units $202_1$~$202_n$ and voltage transformers $203_1$~$203_n$. In other words, it is only required that the voltage transformers $203_1$~$203_n$ are connected to both the power controller 201 and the respective energy storage units $202_1$~$202_n$, and/or the switch array 204 is connected to both the power controller 201 and the respective energy storage units $202_1$~$202_n$.

The charged object 300 is connected to the mobile charging device 200 and receives electric energy supply therefrom. As shown in FIG. 1, before performing the charging, the charged object 300 provides its own electric quantity level Qev to the mobile charging device 200. It shall be noted that the charged object 300 can be an electric vehicle, but it is not limited to this and can be other devices to be charged.

Next, reference will be made to FIG. 2 to describe the specific structure and working details to the power controller 201 in the mobile charging device 200.

Figure 2:
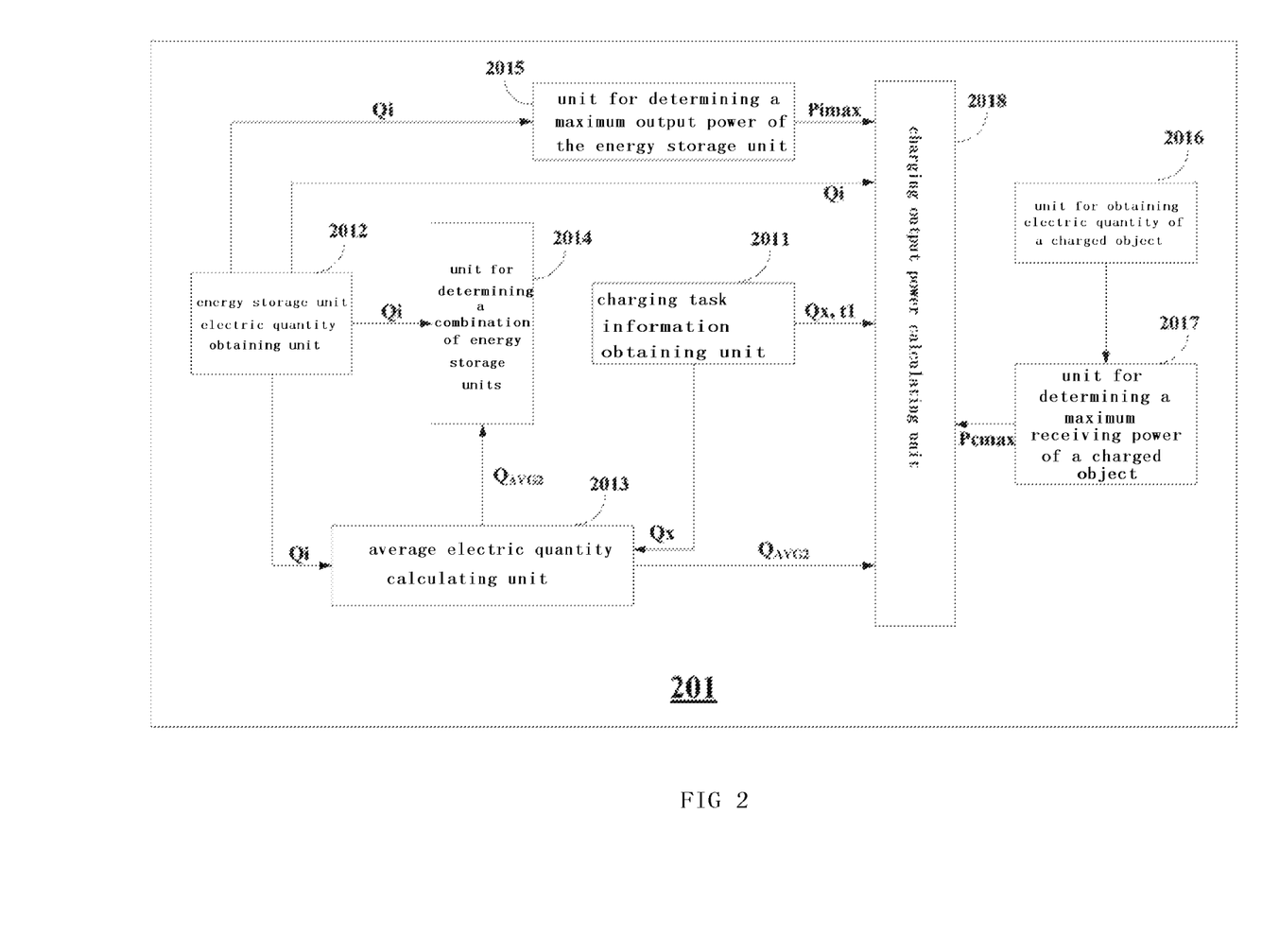
FIG. 2 is a block diagram of a power controller 201 according to the present invention.

FIG. 2 is a block diagram of a power controller 201 according to the present invention. As shown in FIG. 2, the power controller 201 comprises a charging task information obtaining unit 2011, an energy storage unit electric quantity obtaining unit 2012, an average electric quantity calculating unit 2013, a unit 2014 for determining a combination of energy storage units, a unit 2015 for determining a maximum output power of the energy storage unit, a unit 2016 for obtaining electric quantity of a charged object, a unit 2017 for determining a maximum receiving power of a charged object, and a charging output power calculating unit 2018.

The charging task information obtaining unit 2011 obtains a quantity of electricity Qx needed for the charging and a required time length t1 of the charging service from the outside (e.g. the order system 100 shown in FIG. 1) of the mobile charging device 201 before each new charging task is to be performed, thus the mobile charging device 201 is aware that in the charging to be performed, electric energies corresponding to the needed quantity of electricity Qx are to be supplied to the charged object 300 within the required time length t1 of the charging service.

The energy storage unit electric quantity obtaining unit 2012 obtains an electric quantity level Qi of each of the n energy storage units $202_1$~$202_n$ as shown in FIG. 1 before a new charging task is performed, and then provides the obtained electric quantity level Qi of each energy storage unit to the average electric quantity calculating unit 2013, the unit 2014 for determining a combination of energy storage units and the charging output power calculating unit 2018 for subsequent processing.

The average electric quantity calculating unit 2013 calculates an average electric quantity before performing the charging $Q_{AVG1}$ for n energy storage units $202_1$~$202_n$ based on the electric quantity level $Q_i$ of each energy storage unit, and the method for calculation is represented by formula 1 below:

$$Q_{AVG1} = \frac{\sum_{i=1}^{n} Q_i}{n} \quad \text{(formula 1)}$$

Then the average electric quantity calculating unit 2013 estimates an average electric quantity after performing the charging $Q_{AVG2}$ based on the needed quantity of electricity $Q_x$ obtained by the charging task information obtaining unit 2011 and the average electric quantity before performing the charging $Q_{AVG1}$ as calculated by the above formula 1, and the method for estimation is represented by formula 2 below:

$$Q_{AVG2} = \frac{Q_{AVG1} * n - Q_x}{m1 * m2 * n} \quad \text{(formula 2)}$$

wherein m1 is an efficiency of converting the chemical energy of the energy storage unit into electric energy, and m2 is an efficiency of transferring and converting electric energy into chemical energy.

The unit 2014 for determining a combination of energy storage units determines a combination of energy storage units that output electric energy during charging by means of comparing the electric quantity level $Q_i$ of each energy storage unit among the n energy storage units $202_1$~$202_n$ to the average electric quantity after performing the charging $Q_{AVG2}$ as estimated through the above formula 2. In some embodiments, the combination of energy storage units can be determined by such a rule as that if an energy storage battery i has an electric quantity level $Q_i$ smaller than the estimated average electric quantity after performing the charging $Q_{AVG2}$, it is determined that the energy storage battery i does not participate in the charging to be performed, otherwise, if the energy storage battery i has an electric quantity level $Q_i$ greater than the estimated average electric quantity after performing the charging $Q_{AVG2}$, it is determined that the energy storage battery i participates in the charging to be performed. According to such a rule, the combination of energy storage units that output electric energy during charging can be finally determined, wherein said combination of energy storage units includes in energy storage units (m≤n).

As mentioned above, by means of the charging task information obtaining unit 2011, the energy storage unit electric quantity obtaining unit 2012, the average electric quantity calculating unit 2013, and the unit 2014 for determining a combination of energy storage units, the power controller 201 can determine the combination of energy storage units that output electric energy during charging.

The unit 2015 for determining a maximum output power of the energy storage unit determines a maximum output power Pimax of each of the n energy storage units $2021$~$202n$ based on the electric quantity level $Q_i$ of each energy storage unit. In some embodiments, the unit 2015 for determining a maximum output power of the energy storage unit can determine the maximum output power Pimax of each energy storage unit corresponding to the electric quantity level $Q_i$ through an electric quantity-maximum output power lookup table provided by a battery manufacturer. In some other embodiments, the unit 2015 for determining a maximum output power of the energy storage unit can determine the maximum output power Pimax of each energy storage unit corresponding to the electric quantity level $Q_i$ through a battery curve fitting function.

The unit 2016 for obtaining electric quantity of a charged object obtains the electric quantity level of the charged object before each new charging task is performed and provides it to the unit 2017 for determining the maximum receiving power of the charged object.

The unit 2017 for determining a maximum receiving power of a charged object determines a maximum receiving power Pcmax of the charged object based on the electric quantity level thereof obtained by the unit 2016 for obtaining electric quantity of a charged object, and provides the determined maximum receiving power Pcmax to the charging output power calculating unit 2018. In some embodiments, said maximum receiving power Pcmax can be obtained through looking up a table. In some other embodiments, said maximum receiving power Pcmax can be obtained through a curve fitting function of the charged object.

The charging output power calculating unit 2018 calculates a charging output power Pi of each energy storage unit included in the combination of energy storage units (i.e. in energy storage units) based on the electric quantity level $Q_i$ of each energy storage unit included in the combination of energy storage units (i.e. in energy storage units) obtained by the energy storage unit electric quantity obtaining unit 2012 and the corresponding maximum output power Pimax, the maximum receiving power Pcmax of the charged object 300 determined by the unit 2017 for determining a maximum receiving power of a charged object, the average quantity of electricity after performing the charging $Q_{AVG2}$ estimated by the average electric quantity calculating unit 2013, and the required time length t1 of the charging service obtained by the charging task information obtaining unit 2011. In some embodiments, said charging output power Pi can be calculated according to formula 3 below.

$$Pi = \min\left(\frac{(Q_i - Q_{AVG2}) * 60}{t1}, Pcmax, Pimax\right) \quad \text{(formula 3)}$$

As mentioned above, by means of the unit 2015 for determining a maximum output power of the energy storage unit, the unit 2016 for obtaining electric quantity of a charged object, the unit 2017 for determining a maximum receiving power of a charged object, and the charging output power calculating unit 2018, the power controller 201 can determine the charging output power of each energy storage unit included in said combination of energy storage units.

Next, the mobile charging method of the present invention will be described with reference to the mobile charging device 200 as shown in FIGS. 1 and 2.

Figure 3:
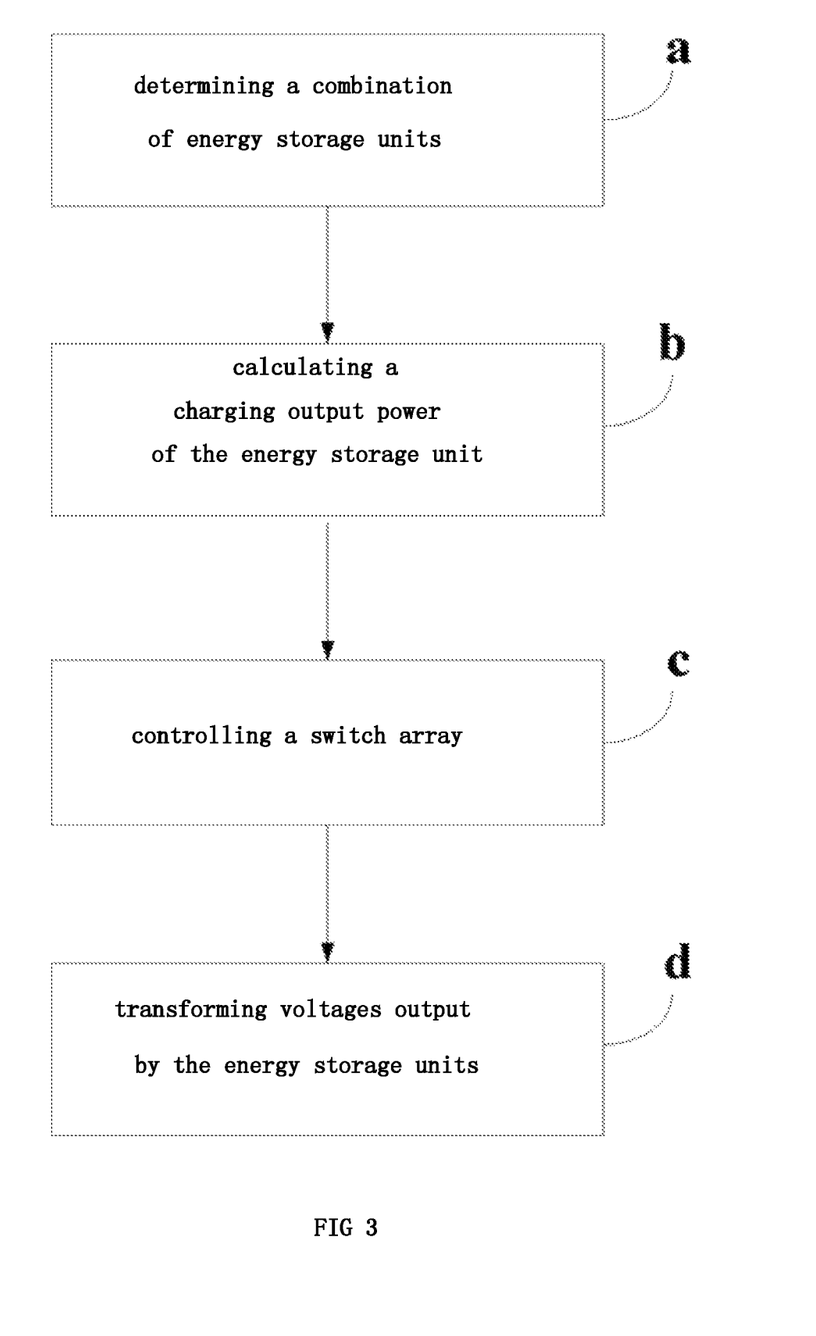
FIG. 3 is a flow chart of a mobile charging method according to the present invention.

FIG. 3 is a flow chart of a mobile charging method according to the present invention. As shown in FIG. 3, said mobile charging method comprises: determining a combination of energy storage units that output electric energy during charging according to the electric quantity level $Q_i$ (i being a positive integer and 1≤i≤n) of each of the plurality of energy storage units $202_1$~$202_n$ used for mobile charging and the quantity of electricity $Q_x$ needed for the charging (step a), and calculating a charging output power Pi (i being a positive integer and 1≤i≤n) of each energy storage unit included in the combination of energy storage units (step b). Details of step a and step b will be described later.

Preferably, in some embodiments, said mobile charging method may further comprise: controlling the switch array 204 arranged corresponding to the plurality of energy storage units $202_1 \sim 202_n$ by instructions CI related to the combination of energy storage units, so that the corresponding switch units included therein change to an ON state (step c).

Preferably, in some embodiments, said mobile charging method may further comprises: transforming voltages output by each energy storage unit included in the combination of energy storage units according to instructions related to the charging output power Pi, so that said energy storage units can output electric energies during charging according to the calculated corresponding charging output power (step d).

Moreover, it shall be noted that although FIG. 3 shows carrying out the mobile charging method in the sequence of step a, step b, step c and step d, the sequences of the steps in the mobile charging method are not limited to this, for example, step c can be performed before step b or together with step b, and step d can be performed before step c or together with step c, as long as step a is performed before steps b, c and d and step b is performed before step d.

Figure 4:
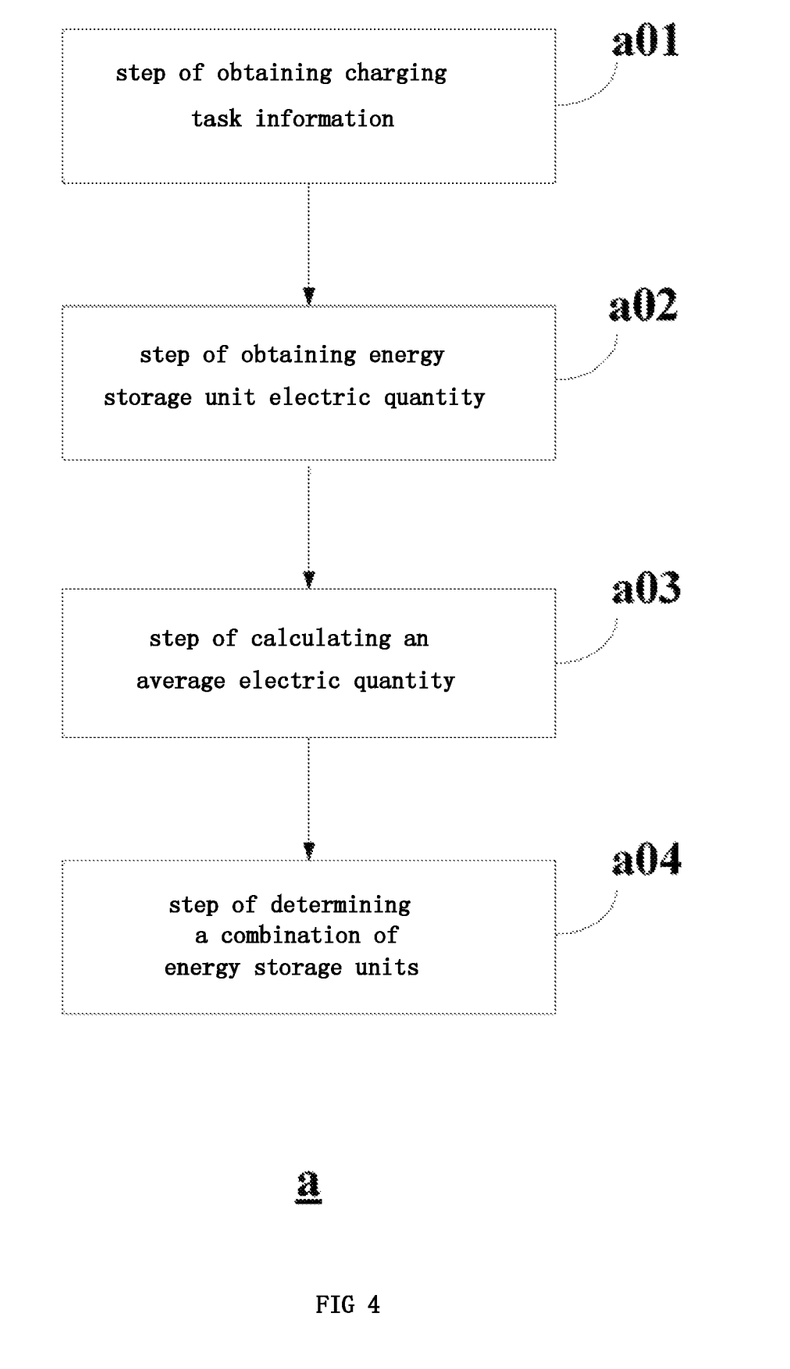
FIG. 4 is a flow chart of step a in the mobile charging method as shown in FIG. 3 according to the present invention.

Now details of step a will be illustrated referring to FIG. 4. FIG. 4 is a flow chart of step a in the mobile charging method as shown in FIG. 3 according to the present invention.

As shown in FIG. 4, step a includes: a step of obtaining charging task information (step a01), a step of obtaining energy storage unit electric quantity (step a02), a step of calculating an average electric quantity (step a03) and a step of determining a combination of energy storage units (step a04).

In said step of obtaining charging task information (step a01), the quantity of electric quantity Qx needed for the charging and the required time length t1 of the charging service are obtained, thus knowing that in the charging to be performed, electric energies corresponding to the needed quantity of electric quantity Qx are to be supplied within the required time length t1 of the charging service.

Next, in step of obtaining energy storage unit electric quantity (step a02), the electric quantity level Qi of each of the plurality of energy storage units $202_1 \sim 202_n$ used for mobile charging is obtained.

Next, in the step of calculating an average electric quantity (step a03), the average quantity of electricity before performing the charging $Q_{AVG1}$ for the plurality of energy storage units $202_1 \sim 202_n$ is calculated based on the electric quantity level Qi of each energy storage unit, and the method for calculation can be represented by formula 4 below.

$$Q_{AVG1} = \frac{\sum_{i=1}^{n} Qi}{n} \quad \text{(formula 4)}$$

Then in the step of calculating an average electric quantity (step a03), the average quantity of electricity after performing the charging $Q_{AVG2}$ is estimated based on the needed quantity of electricity Qx and the average quantity of electricity before performing the charging $Q_{AVG1}$ as calculated by the above formula 4, and the method for estimation can be represented by formula 5 below.

$$Q_{AVG2} = \frac{Q_{AVG1} * n - Qx}{m1 * m2 * n} \quad \text{(formula 5)}$$

wherein m1 is an efficiency of converting the chemical energy of the energy storage unit into electric energy, and m2 is an efficiency of transferring and converting electric energy into chemical energy.

Finally, in the step of determining a combination of energy storage units (step a04), the combination of energy storage units that output electric energy during charging is determined by means of comparing the electric quantity level Qi of each energy storage unit to the average electric quantity after performing the charging $Q_{AVG2}$ as estimated through the above formula 5. In some embodiments, the combination of energy storage units can be determined by such a rule as that if an energy storage battery i has an electric quantity level Qi smaller than the estimated average electric quantity after performing the charging $Q_{AVG2}$, it is determined that the energy storage battery i does not participate in the charging to be performed, otherwise, if the energy storage battery i has an electric quantity level Qi greater than the estimated average electric quantity after performing the charging $Q_{AVG2}$, it is determined that the energy storage battery i participates in the charging to be performed. According to such a rule, the combination of energy storage units that output electric energy during charging can be finally determined, wherein said combination of energy storage units includes m energy storage units (m≤n).

As mentioned above, by means of the step of obtaining charging task information (step a01), the step of obtaining energy storage unit electric quantity (step a02), the step of calculating an average electric quantity (step a03) and the step of determining a combination of energy storage units (step a04), the combination of energy storage units that output electric energy during charging can be determined.

Moreover, it shall be noted that although FIG. 4 shows carrying out step a in the sequence of step a01, step a02, step a03 and step a04, the specific flow of said step a is not limited to this, for example, step a02 can be performed before step a01 or together with step a01, and so on.

Figure 5:
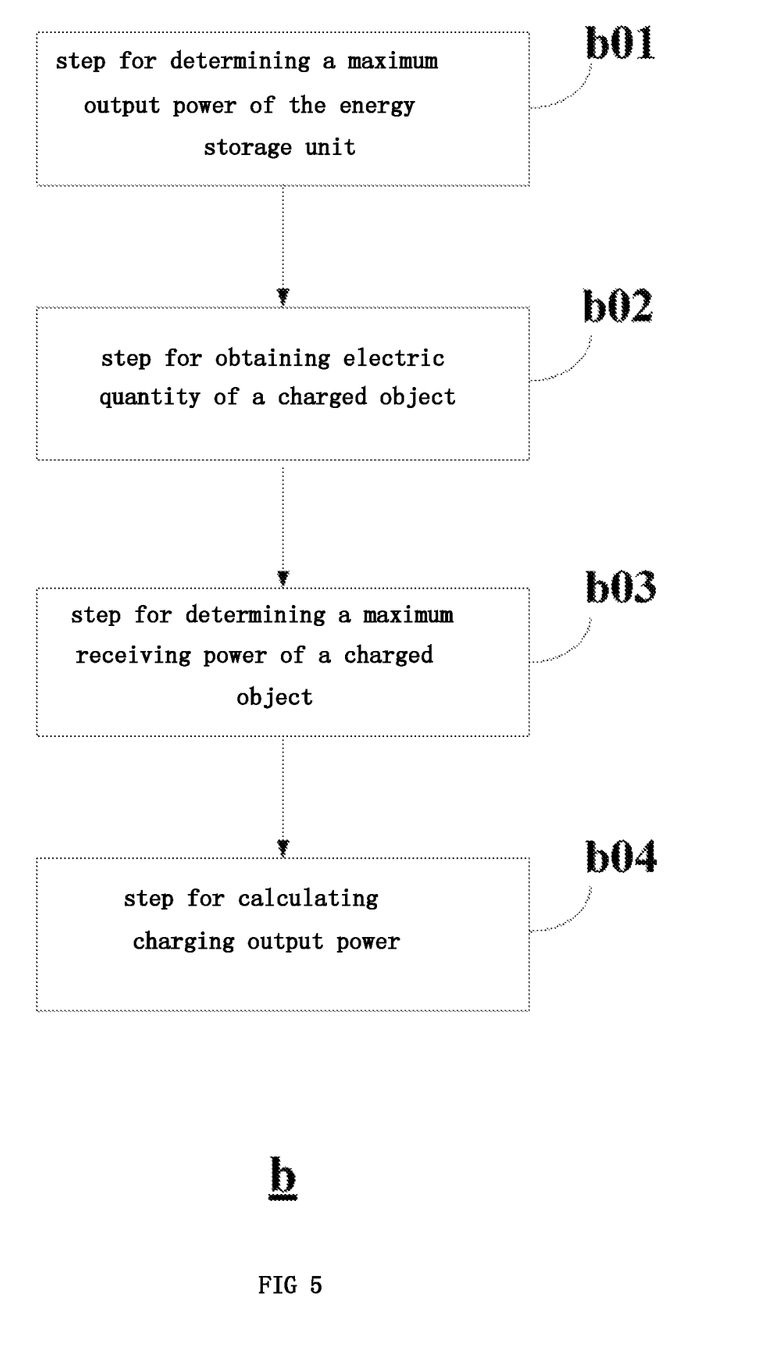
FIG. 5 is a flow chart of step b in the mobile charging method as shown in FIG. 3 according to the present invention.

Now details of step b will be illustrated referring to FIG. 5. FIG. 5 is a flow chart of step b in the mobile charging method as shown in FIG. 3 according to the present invention.

As shown in FIG. 5, step b includes: a step for determining a maximum output power of the energy storage unit (step b01), a step for obtaining electric quantity of a charged object (step b02), a step for determining a maximum receiving power of a charged object (step b03), and a charging output power calculating step (step b04).

In said step for determining a maximum output power of the energy storage unit (step b01), the maximum output power Pimax of each of the plurality of energy storage battery packs $202_1 \sim 202_n$ is determined based on the electric quantity level Qi of each energy storage unit. In some embodiments, the maximum output power Pimax of each energy storage unit corresponding to the electric quantity level Qi can be determined through an electric quantity-maximum output power lookup table provided by a battery manufacturer. In some other embodiments, the maximum output power Pimax of each energy storage unit corresponding to the electric quantity level Qi can be determined through a battery curve fitting function.

Then, in the step for obtaining electric quantity of a charged object (step b02), the electric quantity level of the charged object is obtained, thus the current electric quantity level of the charged object is known before the new charging task is performed.

Then, in the step for determining a maximum receiving power of a charged object (step b03), the maximum receiving power of the charged object is determined based on the electric quantity level thereof. In some embodiments, said maximum receiving power Pcmax can be obtained through looking up a table. In some other embodiments, said maximum receiving power Pcmax can be obtained through a curve fitting function of the charged object.

Finally, in the charging output power calculating step (step b04), the charging output power Pi of each energy storage unit included in the combination of energy storage units (i.e. in energy storage units) is calculated based on the electric quantity level Qi of each energy storage unit included in the combination of energy storage units (i.e. in energy storage units) and the corresponding maximum output power Pimax, the maximum receiving power Pcmax of the charged object, the average quantity of electricity after performing the charging $Q_{AVG2}$, and the required time length t1 of the charging service obtained by the above step a01. In some embodiments, said charging output power Pi can be calculated according to formula 6 below.

$$Pi = \min\left(\frac{(Qi - Q_{AVG2}) * 60}{t1}, Pcmax, Pimax\right) \quad \text{(formula 6)}$$

As mentioned above, by means of the step for determining a maximum output power of the energy storage unit (step b01), the step for obtaining electric quantity of a charged object (step b02), the step for determining a maximum receiving power of a charged object (step b03), and the charging output power calculating step (step b04), the charging output power of each energy storage unit included in said combination of energy storage units can be determined.

Further, it shall be noted that although FIG. 5 shows carrying out step b in the sequence of step b01, step b02, step b03 and step b04, the specific flow of said step b is not limited to this, for example, step b01 can be performed after steps b02 and b03 or together with steps b02 and b03, and so on.

The above examples mainly illustrate the mobile charging device, mobile charging system and mobile charging method of the present invention. Although only some of the specific embodiments of the present invention are described, those skilled in the art shall understand that the present invention can be implemented in various other ways without departing from the spirit and scope thereof. Therefore, the exhibited examples and embodiments are schematic rather than restrictive, and the present invention might cover various modifications and replacements without departing from the spirit and scope of the invention as defined in the appended claims.

The invention claimed is:

1. A mobile charging method, characterized by comprising:
   step a: determining a combination of energy storage units that output electric energy during charging according to an electric quantity level of each of the energy storage units used for the charging and a quantity of electricity needed for the charging; and
   step b: calculating a charging output power of each energy storage unit included in the combination of energy storage units;
   wherein said step a includes:
   a charging task information obtaining step for obtaining the quantity of electricity needed for the charging and a required time length for the charging;
   an energy storage unit electric quantity obtaining step for obtaining the electric quantity level of each of the energy storage units;
   an average electric quantity calculating step for calculating an average electric quantity before performing the charging for the combination of energy storage units based on the electric quantity level of each energy storage unit, and estimating the average electric quantity after performing the charging based on the needed quantity of electricity and the average electric quantity before performing the charging; and
   a step for determining the combination of energy storage units, which determines the combination of energy storage units that output electric energy during the charging by means of comparing the electric quantity level of each energy storage unit to the average electric quantity after performing the charging.

2. The mobile charging method according to claim 1, characterized by further comprising:
   step c: controlling a switch array arranged corresponding to the combination of energy storage units through instructions related to the combination of energy storage units, so that respective switch units included therein change into an ON state.

3. The mobile charging method according to claim 1, characterized by further comprising:
   step d: transforming voltages output by each energy storage unit included in the combination of energy storage units according to instructions related to the charging output power, so that said energy storage units can output electric energy during the charging according to the calculated corresponding charging output power.

4. The mobile charging method according to claim 1, wherein said step b includes:
   a step for determining a maximum output power of the energy storage unit, which determines the maximum output power of each of the energy storage units based on the electric quantity level of each energy storage unit;
   a step for obtaining electric quantity of a charged object, which obtains an electric quantity level of the charged object;
   a step for determining a maximum receiving power of the charged object, which determines the maximum receiving power of the charged objected based on an electric quantity level thereof; and
   a charging output power calculating step, which calculates the charging output power of each energy storage unit included in the combination of energy storage units based on the electric quantity level of each energy storage unit included in the combination of energy storage units and the corresponding maximum output power, the maximum receiving power of the charged object, the average electric quantity after performing the charging, and the required time for the charging.

* * * * *